2,877,212

POLYURETHANES FROM DIFUNCTIONAL POLYMERS OF CONJUGATED DIENES

Kurt L. Seligman, Wilmington, Del., assignor to E. I. du Pont de Nemours and Company, Wilmington, Del., a corporation of Delaware No Drawing. Application October 11, 1954
Serial No. 461,656

13 Claims. (Cl. 260—77.5)

This invention relates to polymeric products containing a plurality of urea or urethane groups and also containing in the molecule high formula weight radicals comprising long chains of carbon atoms. More particularly it relates to polymeric reaction products of organic diisocyanates and high molecular weight diols.

It is known that organic diisocyanates will react with glycols of low molecular weight to form high molecular weight products. Such products are not rubber-like. It is also known that organic diisocyanates may be reacted with high molecular weight polyesters or polyethers to give products which, when chain-extended with compounds containing active hydrogen atoms, may subsequently be cross-linked by means of additional diisocyanate to give useful vulcanized elastomers. Although these elastomers possess many outstanding characteristics, a number of them are susceptible to degradation when in contact with water or water vapor.

It is an object of this invention to provide a class of high molecular weight products which are useful elastomers having extremely low water sensitivity coupled with high tensile strength, abrasion resistance and elasticity.

The products of this invention have a polymer chain consisting predominantly of a plurality of bivalent organic radicals, each separated from the next by an intervening linking group from the class consisting of carbonyl and sulfonyl groups. A minority of the said bivalent organic radicals, but enough to comprise at least 35% by weight of the total weight of the polymeric product, are long chain radicals having formula weights between 750 and 12,000 and having carbon skeletons formed by the polymerization of ethylenically unsaturated monomers of which at least 50% are conjugated dienes. These long chain radicals have at each end the residue obtained by removing hydrogen from a functional group, said residue terminating in an oxygen atom. These terminal residues of functional groups are connected to one another by a linear hydrocarbon chain containing no substitutents other than halogen atoms and monovalent hydrocarbon radicals, preferably of not more than 8 carbon atoms each. Each of the aforesaid carbonyl or sulfonyl linking groups present in the polymeric product is attached directly to at least one of the said bivalent organic radicals other than one of the said long chain radicals, and each linking group attached to one of the said long chain bivalent radicals is a carbonyl group.

One means of producing the products of this invention is by the reaction between organic diisocyanates and bifunctional compounds having a molecular weight between 750 and 12,000 and having at each end a functional group terminating in —OH, said functional groups being connected by a hydrocarbon or halogen-substituted hydrocarbon chain derived from a polymerization involving a conjugated diene. In addition to the high molecular weight bifunctional compound, there may also be employed as chain extending agents such compounds as water, glycols, diamines and the like, each of which contains two active hydrogen atoms capable of reaction with the isocyanate group.

A second method of obtaining the products of this invention is by converting long chain diols to the corresponding bis-chloroformates by the reaction with phosgene in an inert solvent such as toluene and subsequently reacting the bischloroformates in water solution in the presence of an acid acceptor and more phosgene with a primary diamine, corresponding to the diisocyanate which would be used in the method described above.

The long chain bifunctional compounds used in the present invention are ordinarily most conveniently made by polymerizing the appropriate polymerizable, ethylenically unsaturated monomers, at least half of which are conjugated dienes, in the presence of certain free radicals, as more fully discussed below. This yields long hydrocarbon chains terminated at each end with the desired functional groups, or by groups readily convertible to the desired groups by known chemical transformations. Suitable conjugated dienes for the purpose include butadiene, isoprene, 2,3-dimethyl butadiene, chloroprene (2-chlorobutadiene), fluoroprene, bromoprene and the like. Mixtures of these conjugated dienes with minor amounts of other polymerizable ethylenically unsaturated compounds may be used. For example, styrene may be copolymerized with the dienes, to form the long chain carbon skeletons. In all these polymeric products, the main chain will contain side chains to a greater or less extent. These will of course result when radicals are attached to the ethylenic system which takes part in the chain formation. Thus phenyl and methyl side chains in the polymer result from the use of styrene and of isoprene, respectively. Similarly vinyl and other unsaturated side chains result to some extent from butadiene and other conjugated dienes when they react by 1,2 addition. The principal mode of addition of the dienes is 1,4, however, yielding polymers in which the basic unit is —CH$_2$—CH=CH—CH$_2$— or its substitution products such as —CH$_2$—CCH$_3$=CH—CH$_2$— from isoprene and

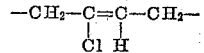

from 2-chlorobutadiene-1,3. In the butadiene polymers made by the procedures described in the examples which follow, the skeleton on the average contains one side chain for each 18 carbon atoms in the principal chain. In the polymerization of chloroprene, only one side chain is formed for about 130 carbon atoms in the chain, on the average. The unsaturated products of the diene polymerizations are readily hydrogenated. Thus butadiene, for example, may be used as the starting material for either saturated or unsaturated long chain, bifunctional compounds. When compounds with unsaturated chains are used, they should preferably be protected throughout against atmospheric oxidation by excluding air or by using an antioxidant.

A convenient source of free radicals for making the above bifunctional compounds by polymerization are the aliphatic azo dicarboxylates in which the carbons attached to the azo group are tertiary, having the general formula

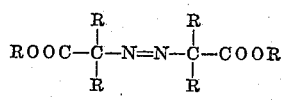

During the polymerization, these compounds yield nitrogen and free radicals corresponding to the groups originally attached to the azo group. The desired molecular weight may be obtained by a proper choice of the ratio of monomer to azo compound as will be illustrated below (see Examples E and F), the higher ratios giving the longer chains. When the dicarboxyalte is reacted with lithium aluminum hydride, LiAlH₄, the carbon chain is not hydrogenated, but the carboxyl groups are reduced and the product is an unsaturated glycol. The compounds may also be made by using free hydroxyl radicals from hydrogen peroxide, for example, as will be further illustrated.

The functional groups at the ends of the high molecular weight bifunctional compound terminate in active hydrogen attached to an oxygen atom. Suitable functional groups include hydroxyl, carboxyl, and sulfo radicals.

Any of a wide variety of organic diisocyanates may be employed in the reaction, including aromatic, aliphatic and cycloaliphatic diisocyanates and combinations of these types. Representative compounds include 2,4-tolylene diisocyanate, 2,6-tolylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanates, i. e., those in which each of the two isocyanate groups is attached directly to an aromatic ring, are preferred. In general they react more rapidly with the long chain bifunctional compounds than do the alkylene diisocyanates. Compounds such as 2,4-tolylene diisocyanate in which the two isocyanate groups differ in reactivity are particularly desirable. The diisocyanates may contain other substituents, although those which are free from reactive groups other than the two isocyanate groups are ordinarily preferred. In the case of the aromatic compound, the isocyanate groups may be attached either to the same or to different rings. Dimers of the monomeric diisocyanates and di(isocyanatoaryl)ureas such as di(3-isocyanato-4-methylphenyl)urea, which are the subject of U. S. Patent 2,757,185, may be used. The diisocyanates may also be used in the form of their reaction products with phenols and with related mercapto compounds, which reaction products regenerate the diisocyanate on heating.

When the elastomers are made without diisocyanate from the bis-chloroformate of the long chain dihydroxy compound, phosgene, and a diamine, the diamine may be any of the primary diamines corresponding to the above diisocyanates such as 2,4-tolylene diamine, m-phenylene diamine, and so on throughout the list.

When a chain extending agent is used in the preparation of the new elastomers of this invention it should contain a plurality of active hydrogen atoms capable of reacting with isocyanates, no more than two atoms in the molecule having active hydrogen attached thereto. Water is the cheapest and in many cases the most desirable chain extending agent. Hydrogen sulfide is another inorganic compound useful for this purpose. There may also be employed organic compounds containing two and only two atoms in the molecule to which are attached active hydrogen atoms. The term "active hydrogen atoms" refers to hydrogens which, because of their position in the molecule, display activity according to the Zerewitinoff test as described by Kohler in J. Am. Chem. Soc., 49, 3181 (1927). In the chain extenders useful in this invention, the active hydrogen atoms are attached to oxygen, nitrogen or sulfur. The groups containing the active hydrogen will ordinarily be —OH, —SH, —NH—, —NH₂, —COOH, —CONH₂, —CONHR where R represents an organic radical, —SO₂OH, —SO₂NH₂ or —CSNH₂. The chain extending compound may be aliphatic, aromatic or cycloaliphatic or of mixed type. Typical of many organic compounds which are useful in this connection are ethylene glycol, hexamethylene glycol, diethylene glycol, adipic acid, terephthalic acid, adipamide, 1,2-ethanedithiol, hydroquinone, monoethanolamine, 4-aminobenzoic acid, m-phenylene diamine, propylene diamine, 4-aminobenzamide, sulfanilamide, aminopropionic acid, 1,4-cyclohexanedisulfonamide, 1,3-propanedisulfonamide, 4-hydroxybenzoic acid, p-aminophenol, ethylene diamine, succinic acid, succinamide, 1,4-butanedisulfonamide, 2,4-tolylene diamine, bis(4-aminophenyl) methane, beta-hydroxypropionic acid and 1,2-ethanedisulfonic acid. Compounds containing at least one amino group are the preferred organic chain extending agents.

The organic chain extenders have certain advantages which will sometimes make it desirable to use them instead of water. They are generally much more soluble in the polymer than is water and their vapor pressures are in most cases much lower. Certain of the chain extending agents are more reactive with isocyanates than others and the speed of reaction may be to some extent controlled by a suitable choice of extending agent. The amines are particularly reactive agents. When water, a carboxylic acid or a sulfonic acid is used as the chain extender, carbon dioxide is evolved during the reaction. This must be removed from the reaction product unless a porous product is desired. With the other common organic chain extenders, no gas is evolved.

The elastomeric products of this invention may be prepared according to several different procedures, in which diisocyanates may or may not be the starting material. In one typical method, the diisocyanate and the long chain dihydroxy compound are mixed in suitable mixing equipment at a temperature which is preferably from 70° to 120° C., but which may range from room temperature, e. g., 20° C., to as high as 150° C. If the molar ratio of diisocyanate to long chain dihydroxy compound is close to unity, the reaction mass may become quite viscous and heavy-duty mixing equipment may be required. After one-half to three hours mixing or whenever there is no further change in the viscosity of the reaction mass, the desired amount of the chain extending agent is added and mixing is continued. When the mass forms tough, rubbery clumps or crumbs or begins to pull away from the mixer, it may be removed from the mixer and worked on a rubber mill to form a smooth band.

The product at this stage is a substantially linear polymeric product in the form of a somewhat elastic, homogeneous solid capable of being cured to form a vulcanized elastomer. If substantially all the isocyanate groups have been used up by reaction with the long chain bifunctional compound or the chain extending agent, the product will be stable and will not cure until additional di- or triisocyanate or other curing agent is added. If free isocyanate groups are present, the product is curable without the addition of any extra curing agent. This condition may exist even though a stoichiometric excess of the chain extending agent is present, since reaction with some of the extending agent proceeds relatively slowly. The product containing free isocyanate groups may be molded and cured directly or may be stabilized against premature curing by the addition of small amounts of a nitrogen base containing at least one hydrogen atom attached to nitrogen. When stabilized in this manner, the reaction product may be stored for extended periods before curing.

Instead of first reacting the dihydroxy compound with the diisocyanate to form what may be referred to as a prepolymer and subsequently reacting this with the chain extending agent as described above, all of the ingredients may be added simultaneously or the diisocyanate may be added to a mixture of the long chain dihydroxy compound and the chain extender. Alternatively, the chain extender may first be reacted with diisocyanate and this reaction product be mixed with either the dihydroxy compound or a reaction product of the latter with additional diisocyanate. Depending on the particular reactants and their molar proportions, the polymeric products obtained by these procedures may differ somewhat in their properties from the products obtainable by the two-step process first described. Instead of using only a single diisocyanate, dihydroxy compound, or chain extender, mixtures of two or more of each type of compound may be employed.

In an alternative procedure, the reaction may be carried out in a solvent for the reactants. The temperatures are preferably those given above for the reaction in the absence of a solvent. Suitable solvents include aliphatic hydrocarbons such as heptane and octane. When the reaction is carried out in such a solvent, the long chain bifunctional compound may first be dissolved and any water that is present may be azeotropically distilled off. The organic diisocyanate is then added and after completion of the reaction between these components, the chain extender is added. After continued stirring and heating, the elastomeric product in many cases separates out, usually in the form of small particles. It may be separated from the solvent by filtration or decantation or by distilling off the solvent, if the product remains in solution, and may then be worked on a heated rubber mill to remove any solvent which still remains. It is then in condition for further compounding or curing.

It has been found that a limited number of solvents of the type containing oxygen or nitrogen, including dimethylformamide, tetrahydrofuran and dioxane, have a definite solvent action on the uncured elastomeric reaction product of this invention. Elastomers may be prepared by reacting together a long chain bifunctional compound as defined above, an organic diisocyanate and a chain extending agent, entirely in solution in such a solvent. The resulting uncured reaction product may be recovered by evaporation of the solvent.

The reaction of the diisocyanates may be accelerated by the presence of a salt of an organic tertiary nitrogen or phosphorus base, such as pyridine. The presence of such a reaction catalyst is particularly useful during the chain extension step.

The elastomers prepared according to the procedures described above are capable of being cured to form highly useful vulcanized elastomers. The curing may involve the further reaction of isocyanate groups or, when unsaturated carbon chains are present in the polymer, it may alternatively be brought about by sulfur in a manner analogous to the curing of rubber. Whenever the uncured reaction product is free of or contains only a small number of free isocyanate groups, either because of the proportions of reactants used or because a stabilizer was employed, it is necessary, unless vulcanization by sulfur is used, to add an additional amount of an organic polyisocyanate, usually a diisocyanate, to accomplish curing. Any of the diisocyanates previously described as useful in the initial reaction with the long chain diol are suitable for use as curing agents. Diisocyanate dimers and such compounds as di(3-isocyanato-4-methylphenyl)urea are particularly convenient curing agents. Curing is often facilitated by incorporating a small amount of magnesium oxide with the uncured elastomer. In practice, the addition of from 1 to 20% of a diisocyanate, based on the weight of the uncured reaction product, is adequate for the curing of stabilized products. The diisocyanate may conveniently be mixed with the uncured product on a rubber mill and the mixture may then be cured by placing it in a mold and heating under pressure. Only enough pressure is required to force the elastomer to assume the shape of the mold. The temperatures and pressures used in ordinary rubber processing are satisfactory for use in curing the elastomers of this invention. Pressures of 50 to 1000 pounds per square inch or higher and temperatures of from 80 to 175° C. are ordinarily satisfactory. At the higher temperatures, shorter curing times must be used to avoid degrading the product. Most of the polymers of this invention may conveniently be cured or vulcanized by heating at 130–135° C. for about 30 minutes. It is also possible to produce curing at room temperature and atmospheric pressure, particularly when the uncured product is in the form of thin sheets, merely by allowing it to stand for a period of several days or longer. When vulcanization is accomplished by means of sulfur, the techniques used in vulcanizing rubber apply, including the use of accelerators and other adjuvants.

When the reaction has been carried out in a solvent in which the reaction product remains soluble, films or coatings may be formed by pouring or otherwise applying the solution to form a thin film and allowing the solvent to evaporate. If the product has not been reacted with a chain extending agent, chain extension can take place by reaction of the polymer with moisture in the air. Curing can take place simultaneously, provided that free isocyanate groups are present. Similarly if the polymer has previously been reacted with the chain extending agent and still contains free isocyanate groups, curing of the film can take place upon standing at either room or elevated temperature. If no free isocyanate groups are present, a curing agent, ordinarily an organic diisocyanate, is added to the solvent system before forming the film. By these procedures thin, pliable, self-supporting films useful as wrapping materials are obtained.

In the preparation of the elastomers, the molar ratio of diisocyanate to the long chain bifunctional compound is preferably between 1.1:1 and 12:1. Polymers formed from mixtures in which the ratio of diisocyanate to the long chain bifunctional compound is less than 1.1:1 are difficult to cure. The use of more than 12 molar parts of diisocyanate for each part of the long chain bifunctional compound is unnecessarily wasteful of the isocyanate. Ordinarily the molar ratio will not exceed 5:1. The most useful range of molar ratios is from about 1.2:1 to 3:1.

The amount of the chain extending compound used may vary considerably. The chain extending agent serves not only to link together the polymer units and so to lengthen the polymer chain, but also to provide active hydrogen atoms which serve as sites for cross-linking. It is thus highly desirable that some chain extender be employed. On the other hand, if the reaction product is permitted to contain too high a proportion of the chain extending agent, the desirable properties conferred by the long chain bifunctional compound are less pronounced. It is generally advantageous to have the molar ratio of long chain bifunctional compound to chain extending agent at least 1:9 and no more than 9:1. In any case, enough of the long chain compound should be incorporated into the reaction product that the long chain residues resulting from it comprise at least 35% of the total weight of the product. In the preferred products of this invention the long chain residues comprise from 60 to 95% of the weight of the product.

As briefly discussed above, when a long chain bifunctional compound, such as a glycol, and an organic diisocyanate react with one another, an initial reaction takes place with the formation of a linear polymer containing urethane linkages. The reaction may be represented as follows:

OCN—B—NCO+HO—L—OH→
. . .—B—NH—CO—O—L—O—CO—NH—B—NH—CO—O—L—O—CO—NH—B—. . .

where B is a bivalent organic radical and O—L—O is the residue obtained by removing the terminal hydrogen atoms from the long chain glycol having a molecular formula weight of at least 750. If the diisocyanate is present in molar excess, this polymer will have terminal isocyanate groups and may be represented by the formula OCN—B(NH—CO—O—L—O—CO—NH—B)$_m$—NCO in which B and O—L—O have the significance stated above, and $m$ is an integer greater than zero. These polymers may then react through their free isocyanate groups with chain extending agents containing active hydrogen. The reactions of isocyanates with the active hydrogen-containing groups present in the various typical chain extending agents are described in the literature as proceeding as follows:

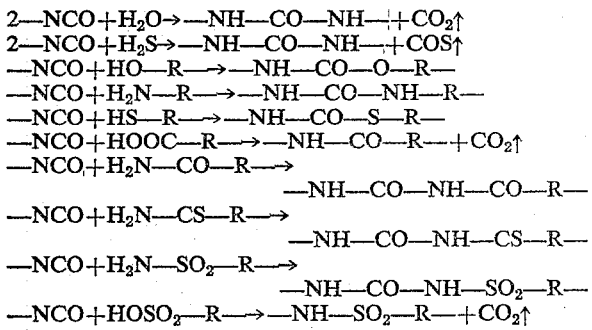

It is apparent from the foregoing table that when water and hydrogen sulfide are used as chain extenders, there is a carbonyl linking group between the imino groups, which imino groups are attached to the isocyanate residues. When the other typical chain extenders are used, an acyl radical is attached to the imino group. Thus, when these other typical chain extenders react with two free isocyanate groups of the isocyanate-terminated prepolymer units and, if present, molecules of the original diisocyanate, a diacyl radical is the connecting radical between the imino groups which are attached to the isocyanate residues. These diacyl radicals are hereinafter referred to by the letter "Q."

After reaction of the chain extending agents with the isocyanate-terminated prepolymer and any excess diisocyanate which may be present, the resulting polymeric product is comprised essentially of structural units having the formula:

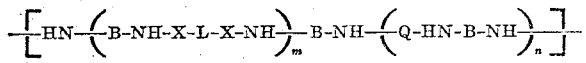

wherein L is a bivalent radical having a molecular weight between 588 and 11,838, said radical having a carbon skeleton formed by the polymerization of ethylenically unsaturated monomers at least 50% of which are conjugated dienes, said monomers being selected from the group consisting of hydrocarbon monomers and halogen-substituted hydrocarbon monomers; X is a radical selected from the group consisting of a carbonyl radical, a sulfonyl radical and a

radical with the terminal oxygen of said

radical being attached to L; B is a bivalent organic radical; Q is a radical selected from the group consisting of a carbonyl radical and a non-polymeric diacyl radical; $m$ is an integer greater than zero; $n$ is an integer including zero; each of the said structural units being connected to the next by a radical Q having the significance defined above.

In the above formula, when a glycol is used as the long chain bifunctional compound, X will be a

radical with the terminal oxygen atom of said radical being connected to L; when the long chain bifunctional compound is a dicarboxylic acid (terminal COOH groups), X will be a carbonyl radical; and when the long chain bifunctional compound is a disulfonic acid (terminal $SO_2OH$ groups), X will be a sulfonyl radical.

When water or hydrogen sulfide is the chain extending agent, the reaction taking place between each molecule of the extending agent and isocyanate groups results in the formation of a urea linkage, whether the isocyanate groups are attached to a prepolymer unit or to a molecule of the original diisocyanate. The chain extended product will then comprise a plurality of —B(NH—X—L—X—NH—B)$_m$— prepolymer units joined to one another or to —B— radicals, in case some of the original diisocyanate was available for reaction, by urea linkages, —NH—CO—NH—. The relative proportions of the prepolymer units and of the —B— radicals will depend on the molar ratios of reactants and the order in which the several ingredients are added. This linear chain extended polymer has a polymer chain consisting predominantly of a plurality of bivalent organic radicals, each separated from the next by an intervening carbonyl group. The bivalent organic radicals in the case of the water or the hydrogen sulfide extended product consist of (a) diimino radicals, —NH—B—NH—, derived from the organic diisocyanate and (b) long chain radicals, —L—, which are derived from the long chain bifunctional compounds.

When an organic chain extending agent other than a sulfonic acid is reacted with the prepolymer, either alone or in the presence of excess diisocyanate, the chain extending bridge which is formed will have the formula —NH—CO—E—CO—NH—, where —E— is the residue resulting from removal of the terminal hydrogens from the chain extending agent. In this case, the resulting polymeric product also has a polymer chain consisting predominantly of a plurality of bivalent organic radicals separated by intervening carbonyl groups, in which the bivalent radicals are (a) diimino radicals, —NH—B—NH—, derived from the diisocyanate, (b) long chain radicals, —L—, derived from the long chain bifunctional compounds, and (c) bivalent radicals, —E—, derived from the organic chain extending agent. The radicals represented by —E— may terminate in an oxygen or sulfur atom, an imino or other non-hydrocarbon radical, or if derived from a carboxylic acid may terminate simply in carbon.

When an organic sulfonic acid is used as the chain extending agent, the prepolymer units and residues of the diisocyanates will be linked by the group —NH—SO$_2$—E—SO$_2$—NH—, in which —E— is the residue of the chain extending agent remaining after removal of the sulfonic acid groups. As in the class described above, the chain extended polymer will have a polymer chain consisting predominantly of a plurality of bivalent organic radicals derived from the diisocyanate, the long chain bifunctional compound, and the chain extender. Instead of all of these organic bivalent radicals being linked to one another by carbonyl groups, however, in this case some of the units will be connected by sulfonyl groups.

Both the long chain bifunctional compound and the chain extending agent ordinarily enter the polymer chain by reacting with isocyanate groups. Accordingly each of the intervening carbonyl or sulfonyl linking groups in the reaction product is normally attached directly to at least one imino group, derived from an isocyanate group, regardless of the nature of the chain extending agent. In many cases, an intervening carbonyl group will be attached to two imino radicals, i. e., it will be part of a urea linkage, as for example when the chain extending agent terminates in amino groups or is water or hydrogen sulfide. In many cases, the portion of the polymer chain separating one long chain residue from the next will contain a plurality of these urea linkages. In every linear polymeric product of this invention derived from a diisocyanate, at least 50% of the bivalent organic radicals in the polymer chain will be diimino radicals. When the chain extender is water, hydrogen sulfide or a diamine, which includes the preferred chain extenders, all of the bivalent organic radicals in the chain joined to one another by carbonyl groups will be either diimino radicals or the residues from the long chain bifunctional compounds. In the preferred product, from 55 to 75% of the bivalent organic radicals will be tolylenediimino radicals and the others will be residues obtained by removing the terminal hydrogen atoms from long chain bifunctional compounds having molecular weights between 750 and 12,000, these radicals being separated from one another by intervening carbonyl groups.

It is apparent that if the long chain bifunctional compound, the diisocyanate, and the chain extending agent are reacted in suitable proportions simultaneously, or if suitable amounts of the chain extending agent are first reacted with diisocyanate under suitable conditions before adding to the long chain bifunctional compound or to the prepolymer, the resulting polymeric product will in each case contain a plurality of bivalent organic radicals derived from the same sources and linked to one another by means of the same intervening groups as in the product which is obtainable by first reacting the long chain bifunctional compound with the diisocyanate and thereafter reacting the resulting prepolymer with a chain extender, as described above.

When the substantially linear uncured reaction product is cured, it is believed that cross-linking of the polymer chains takes place. The cured or vulcanized elastomer is no longer workable on a rubber mill to form a continuous band. Cross-linking ordinarily takes place (when sulfur vulcanization is not used) by the reaction of a compound containing a plurality of isocyanate groups with active hydrogen atoms present in different polymer chains. The hydrogen atoms of urea groups are particularly reactive and when such groups are available, cross-linking ordinarily takes place at these sites. The reaction of the isocyanate with the urea group produces a biuret group by the following reaction:

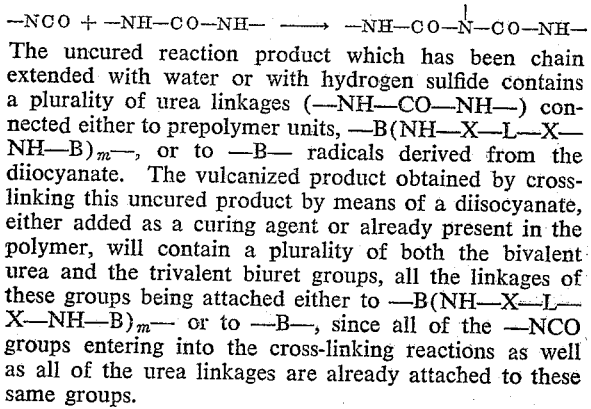

The uncured reaction product which has been chain extended with water or with hydrogen sulfide contains a plurality of urea linkages (—NH—CO—NH—) connected either to prepolymer units, —B(NH—X—L—X—NH—B)$_m$—, or to —B— radicals derived from the diiocyanate. The vulcanized product obtained by cross-linking this uncured product by means of a diisocyanate, either added as a curing agent or already present in the polymer, will contain a plurality of both the bivalent urea and the trivalent biuret groups, all the linkages of these groups being attached either to —B(NH—X—L—X—NH—B)$_m$— or to —B—, since all of the —NCO groups entering into the cross-linking reactions as well as all of the urea linkages are already attached to these same groups.

The cured elastomer obtained from a product in which an organic diamine is the chain extending agent will also contain a plurality of urea and biuret groups, all the linkages of which are attached either to —B(NH—X—L—X—NH—B)$_m$— or to —B—. In this case some of the bivalent organic radicals —B— are derived from the diamine while the rest are derived from the diisocyanate. In this formulation it is to be understood that not all of the B radicals need be the same.

Instead of preparing the elastomers of this invention by reacting the long chain bifunctional compound with a diisocyanate and a chain extending agent, they may alternatively be made, without the use of any diisocyanate, as pointed out above, by first reacting together the long chain dihydroxy compound with phosgene to form a bis-chloroformate ester, and then reacting this product with a diamine and additional phosgene to produce the desired elastomer.

The polymeric products of this invention and the method of preparing them are illustrated by the following examples, in which parts are by weight unless otherwise indicated. In the lettered examples there is described the preparation of long chain bifunctional compounds, while in the numbered examples which follow there is described the preparation of elastomers therefrom.

EXAMPLE A

*Unsaturated long chain dihydroxy compound from butadiene*

Fifty-six parts of a carbethoxy-terminated polymer of butadiene of number average molecular weight 3033 made from butadiene and diethyl 2,2'-azo-bis-isobutyrate is dissolved in 250 parts of dry diethyl ether and dropped during one-half hour into a refluxing solution of 4 parts of lithium aluminum hydride in 250 parts of diethyl ether. The mixture is refluxed for 2 hours and then carefully mixed under nitrogen with 10% hydrochloric acid to give a pH of 2. The ether layer is separated and dried. Removal of the solvent gives a very viscous liquid product which is found to contain no residual carbethoxy groups by infrared analysis.

EXAMPLE B

*Unsaturated long chain dihydroxy compound from chloroprene*

Polymerization is carried out in an emulsion system employing the following recipe:

| | Parts |
|---|---|
| Water | 400 |
| Conc. sulfuric acid | 73.6 |
| Dextrose | 111 |
| Abietyl amine | 12 |
| Chloroprene | 400 |
| $FeSO_4 \cdot 7H_2O$ | 27.8 |
| 30% hydrogen peroxide | 178 |

An organic phase, consisting of the diene and abietyl amine, is added to an aqueous phase consisting of water, sulfuric acid, and dextrose in an Eppenbach Homomixer. The emulsion is poured into a flask and the ferrous sulfate solution and hydrogen peroxide are added to the emulsion in that order. Polymerization is allowed to proceed for two hours at 39–40° under a nitrogen atmosphere and is then terminated with 40 parts of an aqueous, 30% tetraethylthiuram disulfide dispersion in benzene. After addition of 2 parts of phenyl beta-naphthylamine, the latex is coagulated in a saturated salt solution, followed by the addition of ethanol. The aqueous portion is decanted and the residual oil is washed acid-free, first with water and then with a saturated sodium bicarbonate solution, followed by an additional water wash. A benzene solution of the oily product is azeotroped in order to remove any water, and solvent is then stripped off under high vacuum. There are obtained 233 parts of a fluid polymer with a hydroxyl number of 55. The infrared spectrum shows a strong hydroxyl band at 3.00μ.

EXAMPLE C

*Unsaturated long chain dihydroxy compound from chloroprene*

A solution of 400 parts of chloroprene and 103.2 parts of diethyl-2,2'-azo-bis-isobutyrate in 1040 parts of anhydrous toluene is heated at 88–89° for 4.5 hours. After clarifying the solution with charcoal and stripping off the solvent, there are obtained 473 parts of fluid polymer.

A solution of 270 parts of this ester polymer in 640 parts of anhydrous diethyl ether is added to a solution of 15 parts of lithium aluminum hydride in 1280 parts of anhydrous diethyl ether under reflux. Reaction is allowed to proceed at reflux for two hours. Excess lithium aluminum hydride is destroyed by careful addition of 60 parts of water, while cooling the reaction mixture in an ice-bath. A resulting solid is dissolved by addition of 210 parts of a 50% sulfuric acid solution and 500 parts of water. The two phases are separated and the ethereal polymer solution is washed with a saturated salt solution until acid free. The ether solution is dried over anhydrous sodium sulfate and decolorized with charcoal. Evaporation of solvent yields 220 parts of a fluid product which has a hydroxyl number of 65.4 indicating an average molecular weight of 1710.

EXAMPLE D

*Unsaturated long chain dicarboxy compounds from chloroprene*

A solution of 30 parts of chloroprene and 2.55 parts of 2,2'-azo-bis - 4 - carboxy - 2 - methylbutyronitrile in 41.4 parts of dioxane is heated under reflux in an inert atmosphere for 2.5 hours. The solution is cooled and the polymer coagulated in methanol. The supernatant liquid is decanted and the polymer is dissolved in benzene and then recoagulated with methanol. The purification procedure is repeated and the polymer is then dissolved in 88 parts of benzene. Solvent is stripped off and the product dried under vacuum. There are obtained 24 parts of a clear, amber colored polymer which is fluid at elevated temperature. Its acid number is 15.2, indicating an average molecular weight of 7360 for the dibasic acid.

From the same starting materials, a compound of lower molecular weight is prepared by using a larger proportion of the azo compound. Into an autoclave are placed 444 parts of redistilled tetrahydrofuran, 15.7 parts of 2,2'-azo-bis-4-carboxy-2-methylbutyronitrile and 75 parts of chloroprene. The clave is flushed with nitrogen and a pressure of 200 p. s. i. of nitrogen is placed on the charge. The reaction mixture is heated quickly to 95° C. and is maintained at 95±2° C. for 3 hours. After removing the charge from the autoclave, it is filtered and the solvent is stripped off under vacuum. The product, amounting to 65 parts, is clear and very fluid with an acid number of 71.8 for an average molecular weight of 1560.

EXAMPLE E

*Unsaturated long chain dihydroxy compound from isoprene*

A solution of 66.3 parts of isoprene and 2.55 parts of diethyl 2,2'-azo-bis-isobutyrate in methylcyclohexane is heated in an autoclave under nitrogen and in the absence of oxygen for 8 hours at 85° C. The solvent and volatile products are then removed by steam distillation in the absence of oxygen. The residue consisting of polyisoprene with carboxylic ester end groups is reduced with an excess of lithium aluminum hydride in anhydrous ether as in Example C. The product is a viscous oil with a hydroxyl number of about 55, corresponding to a molecular weight of about 2050. Its infrared absorption shows that carbonyl groups are absent.

EXAMPLE F

*Unsaturated long chain dihydroxy compound from isoprene (higher molecular weight)*

A solution of 66.3 parts of isoprene and 1.2 parts of diethyl 2,2'-azo-bis-isobutyrate in methylcyclohexane is heated, the product is isolated and then reduced with lithium aluminum hydride, all as in Example E. The final product, a very viscous oil, has a hydroxyl number of about 29 and a molecular weight of about 3770.

EXAMPLE G

*Saturated long chain dihydroxy compound from isoprene*

The long chain dihydroxy compound of Example E is hydrogenated first at 120° and then at 150° C. under hydrogen pressure in the presence of both a Raney nickel catalyst and a palladium catalyst on charcoal. The product has a molecular weight of about 2100 and an iodine number of 2 indicating that it is substantially completely saturated.

The following examples illustrate the preparation of elastomers from the long chain bifunctional compounds.

EXAMPLE 1

*Elastomer from an unsaturated dihydroxy compound from butadiene*

A toluene solution of a hydroxyl-terminated, unsaturated polymer of butadiene made as described in Example A is made up to a concentration of about 17%, and one-half part of phenyl-beta-naphthylamine is added. The hydroxyl number of this solution is found to be 6.5. Three hundred sixty-four parts of it are mixed with 7.8 parts of 2,4-tolylene diisocyanate at 70° C. The mixture is heated to 80° C., and stirred at that temperature for 25 hours. Twelve parts of water are added and the mixture is then refluxed for 2.5 hours. A gel separates which is removed from the reaction vessel and placed in a shallow pan. When most of the toluene has evaporated, the product is milled at 100° C. It is a very elastic product exhibiting signs of cross-linking.

EXAMPLE 2

*Elastomers from unsaturated dihydroxy compound from chloroprene*

A mixture of 125 parts of hydroxyl polymer made as described in Example B and 22.6 parts of 2,4-tolylene diisocyanate is reacted in a W–P mixer for three hours at 80° C. under a nitrogen atmosphere. Reaction of the resulting prepolymer with 5.14 parts of water for forty minutes at a jacket temperature of 80° C. gives a high molecular weight elastic material which is stabilized on a rubber mill with an excess of piperidine.

When a mixture of 4 parts of the same polymeric diol with 0.486 part of 4,4'-biphenylene diisocyanate is heated for 30 minutes at 140°, an elastomer is also obtained.

EXAMPLE 3

*Elastomers from unsaturated dihydroxy compound from chloroprene*

One hundred parts of polymeric diol made as described in Example C by reduction of the ester are reacted with 21.5 parts of 2,4-tolylene diisocyanate using the procedure of Example 2. The resulting prepolymer is chain-extended with 10.67 parts of water for 1.5 hours, giving 117 parts of an elastomer.

An elastomer is also obtained when a mixture of 4 parts of the same hydroxyl-containing polymer and 0.6 part of 4,4'-biphenylene diisocyanate is heated for 30 minutes at 140°.

The chain-extended elastomer made from 2,4-tolylene diisocyanate is cured with 3,3'-diisocyanato-4,4'-dimethyl carbanilide for 1 hour at 130° C. with and without carbon black, with the following results:

| Proportions of ingredients: | | |
|---|---|---|
| Chain-extended polymer | 100 | 100 |
| Curing agent | 2 | 3 |
| Carbon black | | 20 |
| Properties: | | |
| Tensile strength | 2,020 | 3,040 |
| Elongation at break | 250 | 180 |

EXAMPLE 4

*Elastomers from unsaturated long chain dicarboxy compound from chloroprene*

One hundred ten parts of the carboxyl-terminated polymer of Example D of molecular weight 1560 are mixed with 29.2 parts of 2,4-tolylene diisocyanate and the mixture held at 80° C. for two hours in the presence of 0.25 part of phosphoric acid. The isocyanate prepolymer is chain extended by addition of 12 parts of water. Reaction is complete after ten minutes, and the solid polymer is stabilized with piperidine and dried on a hot mill. The product amounts to 122 parts. It is cured by heating to a tough, elastic product, using 2,4-tolylene diisocyanate as the curing agent.

EXAMPLE 5

*Elastomer from bis-chloroformate of unsaturated long chain dihydroxy polymer from chloroprene*

One hundred seventy parts of a long chain unsaturated diol prepared from chloroprene by a procedure similar to that described in Example C and having a molecular weight of 1525 are slowly added to 560 parts of liquid phosgene in a vessel equipped with agitation and a reflux condenser. The temperature is about 8 to 10° during the addition. A moderate vacuum is applied to the system and phosgene is removed until the molar ratio of phosgene to the polychloroprenebischloroformate is 1.5. 25 parts of this mixture are added to a well-stirred solution of 5.11 parts m-tolylenediamine, 7.4 parts sodium carbonate, and 0.13 part lignin sulfonate ("Marasperse" CB) in 250 parts of water at 9–12° C. On standing, the finely divided polymer slowly coagulates and is removed, washed with water on a rubber wash mill, dried on a heated smooth roll mill and sheeted off.

To 100 parts of the polymer on a rubber mill are added 6 parts of 1,3-bis(3-isocyanato-4-methylphenyl)urea and 1 part of magnesium oxide. After thoroughly mixing, the compounded rubber is cured by heating in a mold in a press at 134° C. for 1 hour. A snappy rubbery slab is obtained with a tensile strength of 1250 p. s. i. at the break.

EXAMPLE 6

*Elastomer from an unsaturated dihydroxy compound from isoprene*

6.15 parts of a glycol prepared as in Example E, of molecular weight 2050 (calculated from the hydroxyl number), and 1.69 parts of 2,4-tolylene diisocyanate in 22 parts of toluene are heated for 3 hours at 112° C. The solvent is distilled off under reduced pressure and the residue is dissolved in 36 parts of tetrahydrofuran and added to a solution of 0.15 m-tolylene-diamine in 18 parts of tetrahydrofuran at room temperature over a period of 20 minutes. The polymer is isolated by evaporating the solvent. When cured with 4% 3,3'-diisocyanato-4,4'-dimethyl carbanilide in a mold for 30 minutes at 134° C., it gives a resilient vulcanizate of high modulus.

100 parts of the same uncured polymer are cured by compounding with 3 parts sulfur, 5 parts zinc oxide, 5 parts stearic acid, 1 part salicylic acid and 0.2 part tetramethyl thiuram monosulfide, and heating for 30 minutes at 134° C.

EXAMPLE 7

*Elastomer from a long chain unsaturated dihydroxy compound of higher molecular weight from isoprene*

7.54 parts of a glycol prepared as in Example F and 0.46 part of 2,4-tolylene diisocyanate in 22 parts of dry toluene are heated 3 hours at 112° C. as in Example 6. The product is further treated in tetrahydrofuran with m-tolylenediamine and cured, all as in Example 6. A similar resilient vulcanizate of high modulus is obtained.

EXAMPLE 8

*Elastomer from a saturated dihydroxy compound from isoprene*

A glycol prepared as in Example G, 11.25 parts, and 1.31 parts of 2,4-tolylene diisocyanate are heated together for 2 hours at 120° C. After cooling, the product is dissolved in 45 parts of tetrahydrofuran and 1.40 parts of water and, after standing one day at room temperature, the solvent is evaporated. The product is a millable, rubbery polymer. 3,3'-diisocyanato-4,4'-dimethyl carbanilide, 0.45 part, is milled into 11.25 parts of the polymer which is then cured at 134° C. in molds for 30 minutes. The cured product shows a modulus of 1040 lbs. per sq. in. at 300% elongation and a tensile strength of 1560 lbs. per sq. in.

The elastomers prepared according to this invention have many varied uses. They may be employed in the preparation of tires, inner tubes, belts, hose and tubing, wire and cable jackets, footwear, sponges, coated fabrics, and a wide variety of coated or molded articles. They are characterized by a number of advantageous properties including excellent resistance to heat and cold, direct sunlight, oxygen and ozone, oil and other hydrocarbon solvents. They display unusually outstanding resistance to mechanical abrasion and to deterioration caused by flexing, stretching and the like. Having a low brittle point, they are particularly useful for fabricating articles to be used at sub-zero temperatures. In fact, some of these products do not become brittle at temperatures as low as −70° C.

The elastomeric properties of these materials may be varied by suitable compounding. The amount and type of compounding agent to be incorporated in the stock is dependent upon the use for which the elastomer is intended. The compounding agents ordinarily used in the rubber industry with either natural or synthetic rubber are useful with the products of this invention. These include carbon black, clay, silica, talc, zinc and magnesium oxides, calcium and magnesium carbonate, titanium dioxide, and plasticizers. Inorganic and organic coloring agents may be incorporated to give well-defined colors, as the natural color of these elastomers is a pale yellow or light amber.

The compounding agents may be incorporated with the elastomer at the same time as additional diisocyanate is added prior to curing. Conventional rubber processing machinery such as rubber mills or Werner-Pfleiderer or Banbury mixers may be used. The resulting compounded stocks may be shaped and cured in conventional equipment used in the rubber industry.

The compounded uncured elastomers of this invention may be dissolved in or extended with solvents to permit their application as coatings. The action of solvents appears to be quite specific and varies from one elastomer to another. Smooth films can be formed by evaporating the solvent from these dispersions.

The solutions or dispersed gels prepared from the uncured elastomers of this invention may be used for forming supported or unsupported films, for coating fabrics or solid surfaces, and for forming adhesive bonds between a wide variety of plastics, elastomers, fabrics, metals, wood, leather, ceramics and the like.

The present invention is also useful in the formation of cellular articles such as sponges, cushions and heat insulators. In making these, the carbon dioxide generated in reactions yielding the final cured polymer is retained in situ to give the cellular structure. Thus the prepolymer, which is made from the long chain diol and which contains free isocyanate groups, and free diisocyanate are mixed with water in amount at least equal to that required to react with all the isocyanate groups present and introduced into a mold or other form. As the reaction proceeds, the carbon dioxide formed expands the polymer to fill the mold with the foamed material, which simultaneously hardens. The relative volume of the cells and the density of the sponge may be varied by varying the amount of isocyanate groups. Agents such as glycerol and other polyhydroxy compounds may be included to give greater fluidity to the mass or to otherwise modify the properties of the foam. Tertiary amines and their salts may be added to accelerate the reaction of the water. Examples of these amines are triethylamine and pyridine. The foams produced from the long chain bifunctional compounds tend to be more elastic than those made from similar diisocyanates and alkyd resins.

The present invention provides a new class of elastomers derived from diisocyanates, which have desirable properties and which are made from relatively inexpensive raw materials.

What is claimed is:

1. A polymeric product, capable of being cured, said product being comprised essentially of structural units having the formula:

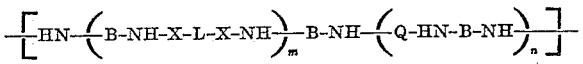

wherein L is a bivalent radical having a molecular weight between 588 and 11,838, said radical having only carbon atoms in the chain linking the X radicals attached to said L radical, said radical being formed by the polymerization of ethylenically unsaturated monomers at least 50% of which are conjugated dienes, said monomers being selected from the group consisting of hydrocarbon monomers and halogen-substituted hydrocarbon monomers; X is a radical selected from the group consisting of a carbonyl radical, and a

radical with the terminal oxygen of said

radical being attached to L; B is a bivalent organic radical said radical being inert to isocyanate groups; Q is a radical selected from the group consisting of a carbonyl radical and a non-polymeric organic radical having terminal acyl groups; $m$ is an integer greater than zero; $n$ is an integer including zero; each of the said structural units being connected to the next by a radical Q having the significance defined above; the overall ratio of the number of B to L radicals in the polymer being between 1.1:1 and 12:1, and at least 35% of the total weight of the polymer being the bivalent radicals L.

2. The polymer of claim 1 wherein the bivalent radical B is an arylene radical.

3. The polymer of claim 1 wherein the bivalent radical B is a 2,4-tolylene radical.

4. The polymer of claim 3 wherein Q is a carbonyl group.

5. The polymer of claim 3 wherein Q is the non-polymeric radical

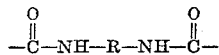

wherein R is a radical selected from the group consisting of alkylene and arylene radicals.

6. The polymer of claim 3 wherein Q is the non-polymeric radical

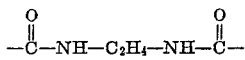

7. The polymer of claim 4 wherein L is a bivalent radical formed by the polymerization of isoprene.

8. The polymer of claim 4 wherein L is a bivalent radical formed by the polymerization of butadiene.

9. The polymer of claim 4 wherein L is a bivalent radical formed by the polymerization of chloroprene.

10. The polymer of claim 1 in the form of a thin, pliable, unsupported film.

11. A linear polymer having the formula

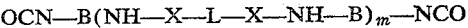

wherein L is a bivalent radical having a molecular weight between 588 and 11,838, said radical having only carbon atoms in the chain linking the X radicals attached to said L radical, said radical being formed by the polymerization of ethylenically unsaturated monomers at least 50% of which are conjugated dienes, said monomers being selected from the group consisting of hydrocarbon monomers and halogen-substituted hydrocarbon monomers; X is a radical selected from the group consisting of a carbonyl radical and a

radical with the terminal oxygen of said

radical being attached to L; B is a bivalent organic radical said radical being inert to isocyanate groups; and $m$ is an integer greater than zero.

12. The polymer of claim 11 wherein the bivalent organic radical B is a 2,4-tolylene radical.

13. In a process for the preparation of curable polymeric products, the step which comprises reacting together a molar excess of an organic diisocyanate with a polymeric long chain bifunctional compound having a molecular weight of between 750 and 12,000, said functional groups being selected from the class consisting of hydroxyl groups and carboxyl groups, the polymeric portion of said bifunctional compound having only carbon atoms in the chain connecting said functional groups and being formed by the polymerization of ethylenically unsaturated monomers at least 50% of which are conjugated dienes, said monomers being selected from the group consisting of hydrocarbon monomers and halogen-substituted hydrocarbon monomers.

References Cited in the file of this patent

UNITED STATES PATENTS

| | | |
|---|---|---|
| 2,511,544 | Riake et al. | June 13, 1950 |
| 2,692,874 | Langerak | Oct. 26, 1954 |

FOREIGN PATENTS

| | | |
|---|---|---|
| 852,882 | Germany | Oct. 20, 1952 |
| 863,407 | Germany | Jan. 19, 1953 |
| 871,831 | Germany | Mar. 26, 1953 |